United States Patent [19]

Jennings, Jr. et al.

[11] Patent Number: 4,787,456
[45] Date of Patent: Nov. 29, 1988

[54] METHOD TO IMPROVE MATRIX ACIDIZING IN CARBONATES

[75] Inventors: Alfred R. Jennings, Jr., Plano; Lloyd G. Jones, Dallas, both of Tex.

[73] Assignee: Mobil Oil Corporation, New York, N.Y.

[21] Appl. No.: 36,742

[22] Filed: Apr. 10, 1987

[51] Int. Cl.⁴ .................. F21B 33/134; F21B 43/263; F21B 43/27

[52] U.S. Cl. .................. 166/281; 166/294; 166/299; 166/300; 166/307

[58] Field of Search .............. 166/299, 300, 294, 295, 166/307, 308, 63

[56] References Cited

U.S. PATENT DOCUMENTS

| | | | |
|---|---|---|---|
| Re. 21,356 | 2/1940 | Pitzer | 166/299 |
| 2,766,828 | 10/1956 | Rachford, Jr. | 166/299 |
| 2,850,098 | 9/1958 | Moll et al. | 166/307 |
| 3,076,762 | 2/1963 | Dill | 252/8.551 |
| 3,233,672 | 2/1966 | Carpenter | 166/307 |
| 3,354,957 | 11/1967 | Every et al. | 166/302 |
| 3,630,284 | 12/1971 | Fast et al. | 166/299 |
| 4,039,030 | 8/1977 | Godfrey et al. | 166/299 |
| 4,103,743 | 8/1978 | Paul | 166/299 |
| 4,157,116 | 6/1979 | Coulter | 166/281 X |
| 4,265,311 | 5/1981 | Ely | 166/271 |
| 4,333,461 | 6/1982 | Muller | 128/284 |
| 4,428,432 | 1/1984 | Pabley | 166/307 X |
| 4,590,997 | 5/1986 | Stowe | 166/250 |
| 4,601,339 | 7/1986 | Jennings, Jr. | 166/281 |
| 4,617,997 | 10/1986 | Jennings, Jr. | 166/299 |
| 4,679,629 | 7/1987 | Abdo et al. | 166/281 |

*Primary Examiner*—George A. Suchfield
*Attorney, Agent, or Firm*—Alexander J. McKillop; Michael G. Gilman; Charles A. Malone

[57] ABSTRACT

A process for improved acidizing in carbonate formations, where controlled pulse fracturing (CPF) is utilized in combination with a retarded acid. The retarded acid comprises hydrochloric, formic, acetic acid or mixtures thereof which is placed in a wellbore adjacent the area to be treated. Said acid can contain retarders and corrosion inhibitors sufficient to make said acid stable in the wellbore. At least one CPF device is placed in said acid near the interval to be treated. Upon detonation of said device, acid is forced into the desired interval, thereby enhancing the acidizing treatment.

16 Claims, 1 Drawing Sheet

METHOD TO IMPROVE MATRIX ACIDIZING IN CARBONATES

This application is related to Ser. No. 946,259, which was filed on Dec. 24, 1986, now U.S. Pat. No. 4,739,832.

FIELD OF THE INVENTION

The invention relates to the treatment of a subterranean formation where a retarded acid is used in combination with high impulse fracturing and a gel plug to improve the effectiveness of matrix acidizing in carbonates.

BACKGROUND OF THE INVENTION

It is a common practice to acidize subterranean formations in order to increase the permeability thereof. For example, in the petroleum industry, it is conventional to inject an acidizing fluid into a well in order to increase the permeability of a surrounding hydrocarbon-bearing formation and thus facilitate the flow of hydrocarbonaceous fluids into the well from the formation or the injection of fluids, such as gas or water, from the well into the formation. Such acidizing techniques may be carried out as "matrix acidizing" procedures or as "acid-fracturing" procedures.

In acid fracturing the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the fractures formed as well as by the chemical reaction of the acid within the formation.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical disruptions within the formation as in fracturing.

In yet another technique involving acidizing, the formation is fractured. Thereafter, an acidizing fluid is injected into the formation at fracturing pressures to extend the created fracture. The acid functions to dissolve formation materials forming the walls of the fracture, thus increasing the width and permeability thereof.

In most cases, acidizing procedures are carried out in calcareous formations such as dolomites, limestones, dolomitic sandstones, etc. One difficulty encountered in the acidizing of such a formation is presented by the rapid reaction rate of the acidizing fluid with those portions of the formation with which it first comes into contact. This is particularly serious in matrix acidizing procedures. As the acidizing fluid is forced from the well into the formation, the acid reacts rapidly with the calcareous material immediately adjacent to the well. Thus, the acid becomes spent before it penetrates into the formation a significant distance from the well. For example, in matrix acidizing of a limestone formation, it is common to achieve maximum penetration with a live acid to a depth of only a few inches to a foot from the face of the wellbore. This, of course, severely limits the increase in productivity or injectivity of the well.

In order to increase the penetration depth, it has heretofore been proposed to add a reaction inhibitor to the acidizing fluid. For example, in U.S. Pat. No. 3,233,672 issued to N. F. Carpenter, there is disclosed an acidizing process in which inhibitor, such as alkyl-substituted carboximides and alkyl-substituted sulfoxides, is added to the acidizing solution. Another technique for increasing the penetration depth of an acidizing solution is that disclosed by U.S. Pat. No. 3,076,762 issued to W. R. Dill, wherein solid, liquid, or gaseous carbon dioxide is introduced into the formation in conjunction with the acidizing solution. The carbon dioxide acts as a coolant, thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Pat. No. 2,850,098 issued to Moll et al. involves the removal of contaminants from a water well and the adjacent formation through the injection of gaseous hydrogen chloride. Still another technique for acidizing a calcareous formation is disclosed in U.S. Pat. No. 3,354,957 issued to Every et al. In this process liquid anhydrous hydrogen chloride is forced from a well into the adjacent formations. The liquid hydrogen chloride vaporizes within the formation and the resulting gas dissolves in the formation water to form hydrochloric acid which then attacks the formation.

The effectiveness of acidizing in removing wellbore damage and improving productivity in carbonate reservoirs is highly dependent upon acid reactivity and contact with the formation in the vicinity of the damage. If the pay zone is extensive (greater than 20 to 25 feet in thickness), diverting methods, such as ball sealers, benzoic acid flakes or paraffin beads, will be used to inject acid into the formation matrix over the entire interval. Where the total zone thickness is large (greater than about 25 feet) it is very difficult to effectively acidize the entire interval, even when diverting agents are used.

Therefore, what is needed is a method whereby an interval in a formation can be isolated, acidized and simultaneously fractured, wherein the acid in its reactive state can penetrate deeply into a formation, thereby increasing its permeability.

SUMMARY OF THE INVENTION

This invention relates to a method for increasing the permeability of a formation, where a high impulse fracturing device is used in combination with an inhibited acid after isolating an interval in said formation. In the practice of this invention, after isolating said interval, an inhibited acid is directed into a wellbore contained in the formation which acid is in an amount sufficient to substantially submerge a desired formation. A high impulse device is then submerged in said acid within said wellbore. Thereafter, said high impulse fracturing device is ignited causing said retarded acid to enter the simultaneous multiple fractures created by said ignited device. After the inhibited acid enters the formation, the inhibitors are inactivated, thereby allowing the acid to increase in strength as it contacts the walls of said fractures. The activated acid in said fractures increases the permeability of said formation.

It is therefore an object of this invention to create multiple simultaneous radial fractures in a formation while acidizing said formation.

It is another object of this invention to enhance the reactivity of an acid with the formation by contacting said acid with a greater area of the formation when multiple simultaneous radial fractures are created.

It is yet another object of this invention to increase the permeability of a formation and stimulate said formation to produce increased volumes of hydrocarbonaceous fluids.

It is still yet another object of this invention to increase the permeability of a calcareous formation containing hydrocarbonaceous fluids for production therefrom while minimizing damage to the wellbore.

DESCRIPTION OF THE PREFERRED EMBODIMENTS

Figure 1:
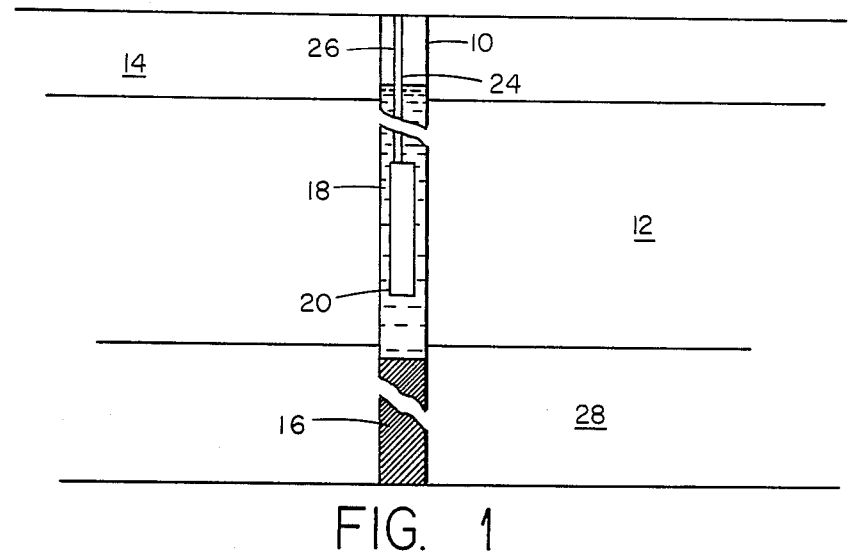
FIG. 1 is a schematic representation showing the placement of the canister in the inhibited acid above the solidified gel plug prior to ignition of the propellant.

In the practice of this invention, referring to FIG. 1, a solidifiable gel material is directed into wellbore 10. This gel material is placed just below interval 12 of formation 14 which is desired to be treated. Interval 12 contains a zone of lesser permeability. Interval 28 contains a zone of greater permeability. Said solidifiable material is of a size sufficient to plug the more permeable zone 28 and said material is pumped into permeable zone 28 under conditions sufficient to selectively close pores in more permeable zone 28. Said solidifiable material is allowed to set for a time sufficient to form a solid plug 16 sufficient to support an inhibited acid 18 thereabove while becoming a solid and closing pores in interval 28 which has a zone of greater permeability. Thereafter, a canister 20 containing a propellant is placed into wellbore 10 via wire 24 above said solid gel plug 16 into inhibited acid 18 and adjacent to interval 12 containing the zone of lesser permeability. Afterwards, wellbore 10 is closed in a manner sufficient to withstand the ignition of a propellant contained in canister 20.

Figure 2:
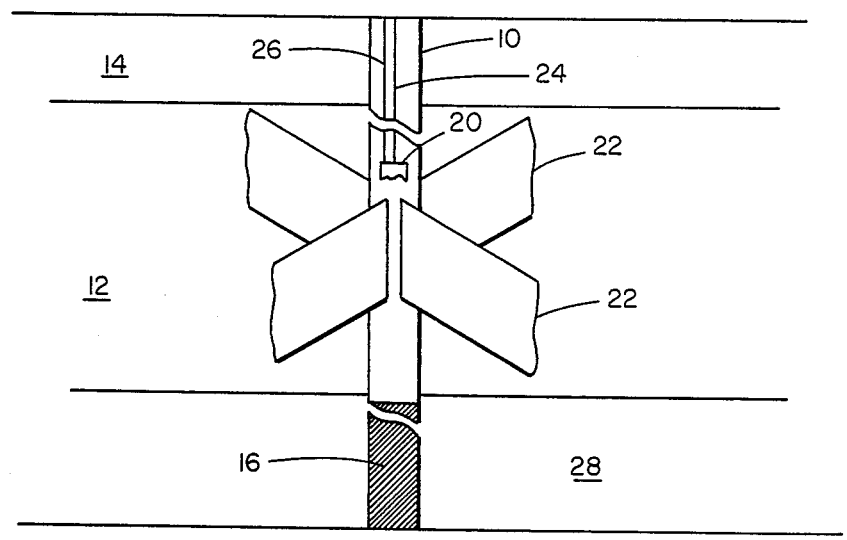
FIG. 2 is a schematic representation depicting the creation of simultaneous fractures in a desired interval above the solidified gel plug.

Subsequently, the propellant contained in canister 20 is ignited. Upon ignition, as shown in FIG. 2, the inhibited acid 18 is forced into interval 12 containing said zone of lesser 12 via simultaneous multiple radial fractures 22 resultant from energy released from the propellant contained in canister 20 as a consequence of said ignition. Since interval is closed by the solidified gel, this interval is not fractured or acidized. Once the inhibited acid is within the fractures, it becomes active and reacts with the walls of said fractures, thereby increasing the size of said fractures. Said acid also increases the distance the fractures penetrate into the formation. This method is effective in acid treating an interval of a formation, where the total zone thickness is 25 feet or more. Acids which can be utilized include hydrochloric acid, formic acid, acetic acid, gelled acids, and other similar acids known to those skilled in the art. When this method is used, matrix acidizing of a formation is improved, particularly carbonate containing formations.

As mentioned above, a pumpable gel mixture is directed into wellbore 10 by pumping the gel mixture into said wellbore by pump means (not shown). After preferably from about 2 hours to about 4 hours, the pumpable gel mixture solidifies. As will be understood by those skilled in the art, the composition of the mixture can be varied to obtain the desired rigidity in the gel. One method of making a suitable pumpable mixture is disclosed in U.S. Pat. No. 4,333,461 issued to Muller on June 8, 1982. This patent is hereby incorporated by reference. The stability and rigidity of the solidified gel depends upon the physical and chemical characteristics of the gel, which characteristics are selected so that the gel plug is of a stability and rigidity adapted to absorb the shock from ignition of the propellant. Generally, these pressures generated upon ignition will vary from about 69,049 kPa to about 551,682 kPa (10,000 psig to 80,000 psig). Instantaneous heat generated upon ignition of the propellant may be greater than about 538° C. (1,000° F.) in the vicinity of the deflagration but is quickly dissipated with propagation.

Often, depending upon the kind of propellant used, it will be necessary to increase the density of the pumpable gel to obtain a gel plug having the desired stability and rigidity to absorb the generated energy. To accomplish this, any solid non-reacting material may be added to the pumpable gel mixture. Preferred non-reacting solid materials include solid rock salt, or naturally occurring sodium chloride, calcium carbonate, and suitably crushed mollusk shells, such as oyster shells.

Other gel mixtures are used to obtain a solidified gel having the desired stability and rigidity. A preferred gel mixture which is used to obtain the desired stability and rigidity, for example, is a mixture of water and hydroproplyl guar gum cross-linked with transitional metals and ions thereof. The purpose of the transitional metal ions is to provide increased strength, stability and rigidity for the solidified gel.

Hydropropyl guar gum is placed into water to form a fluid gel mixture, preferably in an amount of from about 0.70 to about 10.0 weight percent of said mixture. In a particularly preferred embodiment, hydropropyl guar gum is used to form said mixture in an amount of about 7.2 percent by weight of said gel mixture.

Metallic ions are also used in the pumpable gel mixture and include titanium, zironium, chromium, antimony and aluminum. The concentration of these transitional metals in the pumpable gel fluid will vary, depending upon the requirements for the particular propellant being used and the nature of the wellbore and formation into which a canister containing the propellant is placed. Although the exact amounts of the metals required will vary depending on the particular application, the metals should be included within the pumpable gel fluid mixture in amounts of from about 0.005 weight percent to about 0.50 weight percent, preferably about 0.01 weight percent of said pumpable gel fluid mixture.

There are several methods of preparing the types of polymer systems which are used to obtain the solidified gel described herein. The ranges of polymer, buffer, and cross-linker concentrations given encompass two primary methods of forming the gel plugs.

The first method involves guar gum or hydroxypropyl guar as the base polymer. These products are widely used in the petroleum and food industries and are commercially available from chemical suppliers, such as Celanese, Henkel, Hercules, and Millmaster Onyx. For this method, base gel containing the described concentration of about 40 lbs. per 1,000 gallons of water (several types of water, such as about 2% KCl water, city water, formation water, etc., are used) is mixed into a holding tank at the surface (500 bbl. frac tank, for example). The purpose of the base gel is to suspend additional unhydrated guar or hydroxypropyl guar (up to about 600 or so lbs./1,000 gal.) added as the fluid system is pumped into the wellbore. The "secondary" polymer is pretreated by the supplier with glyoxal or similar material to retard hydration. A buffer (such as sodium acetate or sodium pyrophosphate) is added with the additional polymer to maintain a fluid pH value sufficient to hydrate the additional polymer. The hydration of the additional material occurs slowly enough to allow placement of the solidifiable material into the wellbore. The buffers and gelling agents are readily available from the various service companies. In recent years improvements in fluid chemistry have led to "one bag" systems which contain all the described dry additives in one container. Comparable gel plugs can be prepared using hydroxyethyl cellulose (HEC) in the described manner using the primary and secondary polymer approach. HEC is available from Hercules and Henkel.

The second method involves the use of much lower polymer concentrations (about 60 to about 100 lbs./1,000 gal. of water), where viscosity and stability characteristics have been greatly enhanced by cross-linking with solutions of metallic salts. Because of the molecular structure, guar and derivatized guar (hydroxypropyl guar) lend themselves more satisfactorily to cross-linking than HEC. Therefore, the cross-linked guars are most useful in the present invention. The base gel in this instance would consist of the guar in solution at the described concentrations. Buffers are then used, depending on the cross-linker, to maintain a fluid pH necessary for the cross-link reaction. Several methods have been developed and are known in the prior art, as has been suggested herein.

For the guar or hydroxypropyl guar cross-linked with borate, sodium pyrophosphate is used as the buffer, for example, and sodium tetraborate used as the cross-linking agent. The buffer concentration ranges from about 10 to about 20 lbs./1,000 gal., for example, and the borate required ranges from about 5 to about 15 lbs./1,000 gal., depending on the amount of guar or hydroxypropyl guar in the base gel. These materials are available from chemical suppliers and service companies such as have been described herein.

Other cross-linkers which are used include salt solutions of transitional metals such as titanium, chromium, and zirconium. Several cross-linker systems, using titanium in solution, have been developed by DuPont. These include titanium chemically combined with triethanolamine (TYZOR TE) and acetylacetonate (TYZOR AA), as examples. Because of their flexibility and utility, hydroxypropyl guar cross-linked with titanium is a very common present-day fracturing fluid and is available from several service companies; these fluid systems are also known in the prior art. Although not developed to the extent of the titanium cross-linked gel systems, fluids cross-linked with zirconium and chromium are available through the service companies.

Titanium cross-linked gels are more shear and temperature-stable than borate gel systems. The buffer system used for titanium cross-linked gel include sodium acetate, sodium bicarbonate, and organic acids. The buffer(s) are mixed into the base gel and the cross-linker is added as the fluid is pumped. Reaction of the cross-link can be controlled by fluid pH and type and concentration of cross-linker solution used.

The gel plug as described herein is especially advantageous, since it will not "melt" or break down because the intense heat generated by the detonation of the high energy impulse device is localized. Once the acidizing method is completed, hydrochloric acid can be used to chemically break down any remaining gel plug or solid gel within the more permeable zone should it be desired to produce hydrocarbonaceous fluids from the acidized zone and the more permeable zones(s). A concentration of about 15% by weight HCl in water is especially useful. This acid with necessary corrosion inhibitors, etc., is available from the service companies. The HCl solution is circulated down the wellbore using coiled tubing and nitrogen. It is often used with this operation to minimize the amount of fluid in contact with the zone of interest following the high energy impulse treatment.

When using propellants to generate the desired fracturing pressure, it is often desirable to produce a gel plug which will withstand temperatures from about 149° C. to about 232° C. (300° F. to 450° F.) for from about 0.5 of a day to about 4 days. A thermally stable solid gel plug is obtained by mixing into the pumpable gel mixture an oxygen scavenger chemical composition, for example, sodium thiosulfate or a short-chain alcohol or carbinol (such as methanol, ethanol, and isopropanol). However, sodium thiosulfate is preferred. The concentration of the oxygen scavenger, of course, will depend upon the thermal stability desired to be obtained for the gel plug and the solidified gel within said fractures. Moreover, the preferred concentration of the oxygen scavenger chemical composition in the pumpable gel mixture is from about 0.10 percent by weight to about 0.75 percent by weight, most preferably 0.50 percent by weight, based on the total weight of the mixture.

Several different ways are provided for easy removal of any remaining solid gel plug. One variation, which can be utilized to facilitate removal of the gel plug from the wellbore, is to form a solid gel containing a gel breaker. This gel breaker, included in the pumpable gel mixture, is selected from a group of chemical compounds which can break down the solid gel at temperatures of less than about 16° C. to about 121° C. (60° F. to 250° F.). Generally, this breakdown of the gel stem will occur within from about 2 hours to about 24 hours after solidification of the gel mixture in the wellbore, depending upon type and concentration of the gel breaker added. Chemical compositions satisfactory for use as gel breakers, and which may be incorporated into the pumpable gel mixture, include certain enzymes and certain oxidizing agents (such as sodium persulfate) which are suitable for breaking down the solid gel. Other gel breakers are disclosed in U.S. Pat. No. 4,265,311 issued to Ely on May 5, 1981. This patent is hereby incorporated by reference. Enzyme breakers may be obtained commercially from oil field service companies.

The concentration of the gel breaker incorporated into the pumpable gel mixture may vary from about 0.01 weight percent to about 0.10 weight percent, preferably about 0.05 weight percent of the gel mixture. Although the temperature upon ignition in the wellbore may generally exceed about 66° C. (150° F.), the gel plug will remain intact during the generation and dissipation of energy after ignition of the propellant. Upon cooling to a temperature of from about 16° C. to 66° C. (60° F. to about 150° F.), a suitable gel breaker will break down the solid gel plug stem in the wellbore, causing the plug to liquify.

Another method for breaking the gel according to the invention comprises contacting the solidified gel stem with a mineral acid after ignition of the propellant and lapse of a suitable time interval. In those instances where it is undesirable to have a gel breaker incorporated into the gel mixture prior to ignition to remove the solid gel plug, it is preferred to use hydrochloric acid of a strength sufficient to solubilize the solid gel. Hydrochloric acid, and acids similar thereto, can be used to break down the solid gel on contact. Hydrochloric acid of a concentration of about 5.0 percent to about 28 percent, preferably about 15 percent by volume of solution, will generally be sufficient for this purpose. Although hydrochloric acid has been mentioned, other similar mineral acids or strong organic acids may be used.

After the gel is solidified, a solution of inhibited acid is injected into the wellbore over the formed gel plug. Said inhibited acid does not dissolve the gel plug. The solution of acid employed may be any of the aqueous solutions of acid commonly employed for acidizing subterranean calcareous formations. For example, the solution of acid may be an aqueous solution of hydrochloric acid. Commonly, the aqueous solutions of hydrochloric acid employed for acidizing subterranean calcareous formations contain between 5 and 28 percent by weight of hydrogen chloride. An aqueous solution of acetic acid may be also employed. Additionally, an aqueous solution of formic acid may be employed. As is known, when the acid solution becomes spent as the result of reacting with the material of the formation, the solubility of calcium sulfate, i.e., anhydrite or gypsum, dissolved in the acid decreases. Thus, any calcium sulfate dissolved from the formation or derived from the water employed in preparing the solution of acid can precipitate with a consequent decrease in the permeability of the formation.

Accordingly, it is preferred that the solution of acid that is employed contain an agent to inhibit the precipitation of calcium sulfate. Thus, where hydrogen chloride is employed, the solution thereof may contain up to 40 percent by weight of calcium chloride. Additionally, the solution of acid may also contain any of the commonly employed inhibitors for preventing corrosion of metal equipment, such as casing, liner, or tubing in the well.

The amount of solution of acid to be employed will vary according to the radial distance from the well to which the formation is to be acidized and, as stated, this distance may vary up to 15 feet but will not, in most cases, exceed about 10 feet from the well. The amount of solution of acid to be employed will also vary according to the extent to which the material of the formation is to be dissolved. Preferably, the amount of acid should be one hydrocarbon pore volume of the portion of the formation to be acidized. However, lesser amounts may be employed. Generally, the amount employed will be that ordinarily employed in conventional, commercial acidizing operations.

Also, as disclosed in U.S. Pat. No. 3,233,672 issued to Carpenter, inhibitors, such as alkyl-substituted carboximides and alkyl-substituted sulfoxides, can be added to the acidizing solution. This patent is hereby incorporated by reference.

After the inhibited acid has been placed into the wellbore to the desired formation interval sought to be treated, a high energy impulse device or canister containing propellant therein is located within the wellbore. Propellant is contained in the canister or high energy device sufficient to create simultaneous multiple radial fractures within the formation where the acid in its activated state reacts within said fractures. Said fractures are enlarged and lengthened. Upon the creation of these fractures, the reactive acid is forced into said fractures. Once the acid has entered the formation via said fractures, the acid reacts with the formation, thereby increasing the permeability within said formation. This increase in permeability allows for increased volumes of hydrocarbonaceous fluids to be produced from a formation containing same.

Said propellant can belong to the modified nitrocellulose or the modified or unmodified nitroamine propellant class. Another suitable propellant is a composite propellant which contains ammonium perchlorate in a rubberized binder. Other suitable propellants are discussed in U.S. Pat. No. 4,590,997 which issued to Stowe on May 27, 1986. This patent is hereby incorporated by reference.

After the steps of this method are completed, instead of removing the solid gel plug, additional inhibited acid and another propellant device can be placed into the wellbore and the method repeated. Also, by directing additional solidifiable gel material into the wellbore, the level of the gel plug in the wellbore can be raised, and other desired intervals can be treated where a multi-interval formation is encountered. If needed, the method can be repeated until the formation has been acidized to the extent desired.

In another embodiment, this method may be used in the absence of a gel plug when it is desired to fracture and acidize only one interval of a formation. This method will be particularly beneficial in the absence of gel in those situations where no substantial variation in permeabilities exists in a formation, and the productive interval exceeds about 100 feet. When the method is utilized in this manner, it is only necessary to place the inhibited acid, as discussed above, into the wellbore. Afterwards, a cannister containing a propellant is suspended into the wellbore substantially near the interval desired to be treated. Thereafter, said propellant is ignited which ignition causes the release of energy sufficient to form more than two simultaneous radial fractures which energy also causes said acid to enter the fractures and react therein. This reaction increases the permeability of said interval. Of course a propellant similar to those discussed above may be used.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for increasing the permeability of a formation which formation has at least one zone of lesser permeability and one zone of greater permeability where high energy impulse fracturing is used in combination with an inhibited acid comprising:
   (a) directing into a wellbore within said formation a pumpable solidifiable gel into the zone of the formation having the zone of greater permeability under conditions to selectively close pores in said greater permeability zone;
   (b) allowing said pumpable gel to solidify and form a gel plug within said wellbore which plug is sufficient to support a desired volume of acid;
   (c) placing an inhibited acid into said wellbore above said gel plug adjacent to said zone of lesser permeability;

(d) suspending a canister containing a propellant into the wellbore substantially near said zone of lesser permeability; and (e) igniting said propellant which releases energy sufficient to form more than two simultaneous radial fractures in said zone of lesser permeability which also causes said acid to enter said fractures and thereafter react within said fractures, thereby increasing the permeability of said zone of lesser permeability.

2. The method as recited in claim 1, where hydrocarbonaceous fluids are produced from said formation after step (e).

3. The method as recited in claim 1, which comprises adding a solid non-reactant composition to the gel mixture in an amount sufficient to increase the density of the gel, whereby within a time of up to about 4 hours said gel mixture becomes a solid gel plug of sufficient density to withstand the energy released from said propellant when ignited, which ignition results in a temperature of up to greater than about 538° C. (1,000° F.) and pressure of about 551,682 kPa (80,000 psig).

4. The method as recited in claim 1, wherein a solid is added to said gel mixture and said solid is a member of the group consisting of sodium chloride and calcium carbonate which is added to said gel mixture in an amount sufficient to increase the density of said gel, whereby within a time of up to about 4 hours said gel becomes solid in said fractures while producing a gel plug of sufficient density to withstand the energy released from said propellant when ignited, which ignition results in a temperature of up to greater than about 538° C. (1,000° F.) and a pressure of about 551,682 kPa (80,000 psig).

5. The method as recited in claim 1, wherein a gel breaker is added to the gel mixture in an amount sufficient to break down the solid gel stem formed in the wellbore at a temperature of up to about 121° C. (250° F.) within a time of up to 24 hours.

6. The method as recited in claim 1, wherein an oxygen scavenger is placed into said gel mixture, and said oxygen scavenger is a member selected from the group consisting of sodium thiosulfate and a short-chain alcohol.

7. The method as recited in claim 1, wherein an oxygen scavenger is included in said gel mixture in a concentration of from about 0.10 percent by weight to about 0.75 percent by weight of said mixture, and where said oxygen scavenger is a member selected from the group consisting of sodium thiosulfate and a short-chain alcohol.

8. The method as recited in claim 1, wherein said gel mixture includes a gel breaker capable of breaking down said solid gel plug, and where said gel breaker comprises an enzyme and/or an oxidizing agent.

9. The method as recited in claim 1, wherein hydrochloric acid in a concentration of from about 5 percent to about 28 percent by volume of solution is made to contact the solid gel and break down said solid gel plug to facilitate its removal from the wellbore.

10. The method as recited in claim 1, wherein said gel mixture comprises hydropropyl guar gum cross-linked with a transitional metal ion which is a member selected from the group consisting of titanium, zirconium, chromium, antimony and aluminum ions.

11. The method as recited in claim 1, wherein said gel mixture comprises hydropropyl guar gum cross-linked with a transitional metal ion which is a member selected from the group consisting of titanium, zirconium, chromium, antimony and aluminum ions which is included within said gel mixture in an amount of from about 0.005 weight percent to about 0.50 weight percent of said gel mixture.

12. The method as recited in claim 1, where steps (a) through (e) are repeated and the height of solid gel plug is increased so as to treat a different interval or zone in the formation.

13. The method as recited in claim 1, where the zone or interval to be treated is of a thickness greater than about 25 feet.

14. A method for increasing the permeability of a formation, where high energy impulse fracturing is used in combination with an inhibited acid comprising:

(a) placing an inhibited acid into a wellbore adjacent to the interval of the formation desired to be treated which acid is of strength sufficient to react with said formation;

(b) suspending a canister containing a propellant into the wellbore substantially near said interval; and (c) igniting said propellant which releases energy sufficient to form more than two simultaneous radial fractures which also causes said acid to enter said fractures and thereafter react within said fractures, thereby increasing the permeability of said interval.

15. The method as recited in claim 14, where hydrocarbonaceous fluids are produced from said formation after step (c).

16. The method as recited in claim 14, where said interval to be treated is of a thickness greater than about 25 feet.

* * * * *